United States Patent [19]
Honguh

[11] Patent Number: 5,666,339
[45] Date of Patent: Sep. 9, 1997

[54] OPTICAL INFORMATION REPRODUCING APPARATUS USING TRANSVERSAL FILTER

[75] Inventor: Yoshinori Honguh, Yokohama, Japan

[73] Assignee: Kabushiki Kaisha Toshiba, Kawasaki, Japan

[21] Appl. No.: 710,278

[22] Filed: Sep. 13, 1996

Related U.S. Application Data

[63] Continuation of Ser. No. 503,613, Jul. 18, 1995, abandoned.

[30] Foreign Application Priority Data

Jul. 20, 1994 [JP] Japan ................................. 6-168166

[51] Int. Cl.$^6$ ........................................ G11B 7/00
[52] U.S. Cl. ................................. 369/48; 369/124
[58] Field of Search .......................... 369/48, 124, 59, 369/58, 32, 100, 44.32, 54; 360/39, 43

[56] References Cited

U.S. PATENT DOCUMENTS

| | | | |
|---|---|---|---|
| 4,539,691 | 9/1985 | Ogawa et al. | 369/59 |
| 4,780,772 | 10/1988 | Shibuya et al. | 369/59 |
| 5,166,914 | 11/1992 | Shimada et al. | 369/48 |
| 5,181,161 | 1/1993 | Hirose et al. | 369/48 |
| 5,442,615 | 8/1995 | Ohsato et al. | 369/58 |

OTHER PUBLICATIONS

Optical disk Technique; Ogami, Murayan, Koide, Yamada, Kunikane, Feb. 10, 1989.
Nikkei Electronics; Moriyama, Yamamoto, Shimizu, Mar. 28, 1994.

*Primary Examiner*—Nabil Hindi
*Attorney, Agent, or Firm*—Oblon, Spivak, McClelland, Maier & Neustadt, P.C.

[57] ABSTRACT

An optical information reproducing apparatus according to the present invention optically reproduces information from a recording medium on which the information is recorded as a mark string, and comprises irradiation section for irradiating a light beam onto the recording medium through an object lens, and signal processing section for detecting diffraction light from the recording medium as a reproducing signal and processing the obtained reproducing signal to reproduce the information recorded on the recording medium. With this configuration, the signal processing section includes a transversal filter having delay section with a plurality of taps for receiving the reproducing signal, and section for performing weighted addition of output signals from the respective taps of the delay section with predetermined tap coefficients, the transversal filter having a delay time g between the respective adjacent taps, the delay time g being given by one of $\tau=(0.37 \text{ to } 0.51)\times\lambda / (v \times NA)$ and $\tau = L_{min}/v$ where $\lambda$ is a wavelength of the light beam, NA is a numerical aperture of the object lens, $L_{min}$ is a minimum mark length of the mark string, and v is a speed of the recording medium relative to the light beam.

9 Claims, 6 Drawing Sheets

OPTICAL INFORMATION REPRODUCING APPARATUS USING TRANSVERSAL FILTER

This application is a Continuation of application Ser. No. 08/503,613, filed on Jul. 18, 1995, now abandoned.

BACKGROUND OF THE INVENTION

1. Field of the Invention

The present invention relates to an optical information reproducing apparatus for reproducing information recorded as a mark string on a recording medium by irradiating a light beam thereon and, more particularly, to a signal processing circuit for processing a reproducing signal in an optical information reproducing apparatus.

2. Description of the Related Art

An optical information reproducing apparatus (e.g., an optical disk apparatus using a disk-like recording medium called an optical disk) is designed to record information as mark strings on an optical disk along helical (or concentrical) tracks, and optically reproduce the recorded information by irradiating a light beam such as a laser beam thereon and detecting reflection/diffraction light.

As apparatuses allowing users to record information signals on optical disks with laser beams, document file systems and the like have already been commercialized, and products used as peripheral devices of computers, which demand higher reliability, have also been put into practice. In addition, apparatuses and the like which can erase recorded information and write new information have been put into practice. Optical card memory devices and optical tape memory devices, which are obtained by applying the same technique to card- and tape-like recording media, are being developed. Furthermore, compact disks, CD-ROMs, laser disks, and the like have been put into practice as read-only optical disks.

The above optical information reproducing apparatus reproduces information by tracking a recorded mark string having a size of about 1 μm, and a track pitch of about 1.6 μm with, e.g., a laser beam having an optical spot diameter focused to about 1.2 μm. As schemes of recording marks, various schemes have been proposed and put into practice. For example, in a read-only optical disk, when a substrate is molded by a stamper, recesses/projections called pits are locally formed. In an optical disk of the type which allows the user to record information, a recording film is subjected to changes in optical characteristics due to local destruction, deformation, or phase change.

Similar to other storage devices, as the application field of these optical information reproducing apparatus expands, an increase in capacity and a decrease in size have been required. For this reason, attempts have been made to attain higher recording densities.

As methods of increasing the recording density, a method of increasing the line recording density and a method of increasing the track density are available. These methods, however, have their own limits. More specifically, in order to increase the line recording density, the period of a fundamental clock (to be referred to as a channel clock hereinafter) in the recording mode may be shortened. This, however, increases waveform deformation due to intersymbol interference of a reproducing signal. For this reason, it is difficult to keep the error rate within an allowable range. In order to increase the track density, the track pitch may be decreased. This, however, increases the influence of crosstalk between adjacent tracks on reproducing signals. For this reason, it is also difficult to set the error rate in the allowable range.

As described above, in the conventional optical information reproducing apparatus, if the period of a fundamental clock in the recording mode is shortened to increase the line recording density, the waveform deformation due to intersymbol interference of a reproducing signal increases. If the track pitch is decreased to increase the track density, the influence of crosstalk between adjacent tracks on a reproducing signal increases. In either case, it is difficult to keep the error rate in an allowable range.

The above problem is noticeable especially when an optical disk has a tilt (e.g., a relative tilt with respect to a light beam). Although no consideration has been given to the tilt of an optical disk, the influence of the tilt of the optical disk is large, like intersymbol interference and crosstalk. For this reason, the schemes of attaining higher recording densities by increasing the line recording density and the track density have their own limits.

SUMMARY OF THE INVENTION

It is an object of the present invention to provide an optical information reproducing apparatus which can effectively reduce the influences of intersymbol interference and crosstalk in a reproducing signal.

It is another object of the present invention to provide an optical information reproducing apparatus which can effectively reduce the influences of intersymbol interference and crosstalk in a reproducing signal even if a recording medium tilts with respect to a light beam.

In an optical information reproducing apparatus in which a light beam is irradiated onto a recording medium, on which information is recorded as a mark string, through an object lens, and a reproducing signal obtained by detecting diffraction light from the recording medium is processed by signal processing means to reproduce the information, the present invention is characterized in that the reproducing signal is equalized by using a transversal filter (or a filter having an effect equivalent to that of the transversal filter) in the signal processing means, and the tap period (i.e., delay time), tap coefficients, or frequency characteristics of the filter (transversal filter) are optimized to obtain a reproducing signal having undergone a reduction in the influences of intersymbol interference and crosstalk.

A first optical information reproducing apparatus for optically reproducing information from a recording medium on which the information is recorded as a mark string, is characterized by comprising: irradiation means for irradiating a light beam onto the recording medium through an object lens; and signal processing means for detecting diffraction light from the recording medium as a reproducing signal, and processing the obtained reproducing signal to reproduce the information recorded on the recording medium, wherein the signal processing means includes a transversal filter having delay means with a plurality of taps for receiving the reproducing signal, and means for performing weighted addition of output signals from the respective taps of the delay means with predetermined tap coefficients, the transversal filter having a delay time g between the respective adjacent taps, the delay time g being given by one of $$\tau = (0.37 \text{ to } 0.51) \times \lambda/(v \times NA)$$

and $$\tau = Lmin/v$$

where λ is a wavelength of the light beam, NA is a numerical aperture of the object lens, Lmin is a minimum mark length of the mark string, and v is a speed of the recording medium relative to the light beam.

According to the first optical information reproducing apparatus, the waveform distortion due to the influences of intersymbol interference in the reproducing signal is reduced or canceled by setting the tap period in the transversal filter in the above manner.

A second optical information reproducing apparatus is characterized in that the transversal filter has at least first to fifth taps, and when tap coefficients by which output signals from the first to fifth taps are multiplied are respectively represented by a·(−f2), a·(−f1), a·{1+2(f1+f2)}, a·(−f1), and a·(−f2) (a is a constant other than 0), coefficients f1 and f2 are given by $$0.01 \leq f1 \leq 0.05$$

$$0.01 \leq f2 \leq 0.04.$$

In this case, by selecting tap coefficients for the transversal filter having, e.g., five taps in the above manner, good equalizing characteristics exhibiting a window occupation ratio of almost 20% or less that required in practice can be obtained. Therefore, the influences of intersymbol interference is reduced more effectively.

A second optical information reproducing apparatus for optically reproducing information from a recording medium on which the information is recorded as a mark string, is characterized by comprising: irradiation means for irradiating a light beam onto the recording medium through an object lens; and signal processing means for detecting diffraction light from the recording medium as a reproducing signal, and processing the obtained reproducing signal to reproduce the information recorded on the recording medium, wherein the signal processing means includes a transversal filter having equalizing characteristics optimized for a tilted state of the recording medium with respect to the light beam.

In the second optical information reproducing apparatus, a light beam is not perpendicularly incident on the surface of the recording medium but is incident at a predetermined angle (i.e., in a tilted state). In this case, since the equalizing characteristics of the transversal filter are optimized for the tilted state of the recording medium with respect to the light beam, even if the recording medium tilts with respect to the light beam, a reproducing signal having undergone a reduction in the influences of intersymbol interference and crosstalk can be obtained.

In the second optical information reproducing apparatus, the transversal filter has at least first to fifth taps, and when tap coefficients by which output signals from the first to fifth taps are multiplied are respectively represented by a·(−f2), a·(−f1), a·{1+2(f1+f2)}, a·(−f1), and a·(−f2) (a is a constant other than 0), coefficients f1 and f2 are given by $$0.03 \leq f1 \leq 0.07$$

$$0.015 \leq f2 \leq 0.04$$

or $$0.04 \leq f1 \leq 0.11$$

$$0.01 \leq f2 \leq 0.06.$$

By selecting tap coefficients for the transversal filter in this manner, even if the recording medium tilts at 10 mrad, which is allowed in practice, with respect to the light beam, the influences of intersymbol interference and crosstalk can be effectively reduced.

A third optical information reproducing apparatus for optically reproducing information from a recording medium on which the information is recorded as a mark string, is characterized by comprising: irradiation means for irradiating a light beam onto the recording medium through an object lens; and signal processing means for detecting diffraction light from the recording medium as a reproducing signal, and processing the obtained reproducing signal to reproduce the information recorded on the recording medium, wherein the signal processing means includes a filter having frequency response function given by $$g(v0) = (1.12 \text{ to } 1.28) \times g(0)$$

$$g(v0/2) = (1.12 \text{ to } 1.30) \times g(0)$$

or $$g(v0) = (1.16 \text{ to } 1.44) \times g(0)$$

$$g(v0/2) = (1.12 \text{ to } 1.46) \times g(0)$$

or $$g(v0) = (1.12 \text{ to } 1.44) \times g(0)$$

$$g(v0/2) = (1.12 \text{ to } 1.46) \times g(0)$$

where g(v) is an amplification factor for a signal component having a frequency v of the reproducing signal, and v0 is a maximum frequency of the modulation signal.

The third optical information reproducing apparatus uses an analog filter instead of a transversal filter unlike the first and second optical information reproducing apparatuses. In the third optical information reproducing apparatus, by setting the frequency characteristics of the filter in the above manner, the same effects as those obtained by the transversal filter in the first and second optical information reproducing apparatuses can be obtained by the simple analog filter including no delay circuit with taps.

As described above, according to the present invention, a reproducing signal can be properly equalized, and the error rate can be greatly reduced. As a result, higher signal quality can be obtained by using the same optical system as that in the conventional apparatus, and the line recording density or track density can be increased, thereby realizing an increase in recording density and an improvement in reliability in information recording.

According to the present invention, therefore, there is provided an optical information reproducing apparatus which can effectively reduce the influences of intersymbol interference and crosstalk appearing in a reproducing signal from a recording medium such as an optical disk, and can also reduce these influences even if the recording medium tilts with respect to a reproducing light beam.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

Embodiments of the present invention will be described below with reference to the accompanying drawings.

Figure 1:
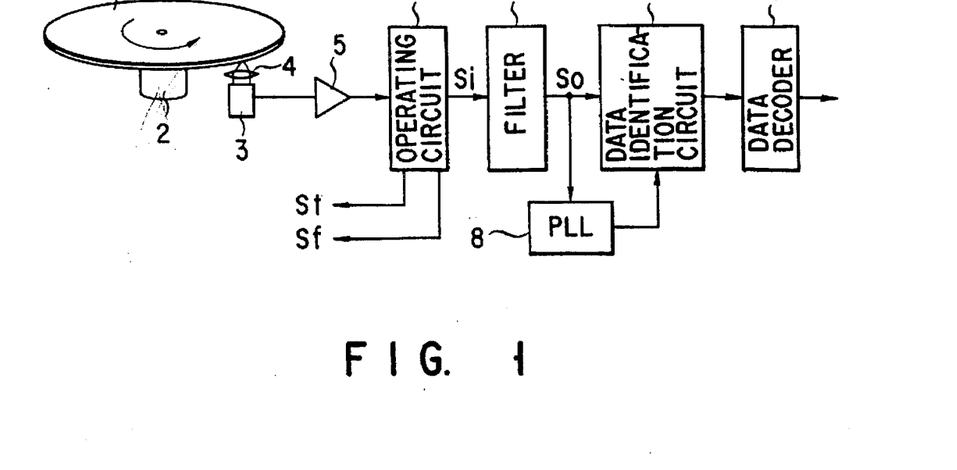
FIG. 1. is a block diagram showing the basic arrangement of an optical information reproducing apparatus according to the present invention.

FIG. 1 is a block diagram showing the schematic arrangement of an optical information reproducing apparatus according to an embodiment of the present invention.

The optical information reproducing apparatus of the present invention comprises an optical head 3, an object lens 4, an amplifier 5, an operating circuit 6, a filter 7, a PLL (phase lock loop) 8, a data identification circuit 9, and a data decoder 10.

Information modulated into a predetermined modulation signal is recorded as a mark string, e.g., a pit string, on an optical disk 1.

The information recorded on the optical disk 1 is reproduced as follows.

While the optical disk 1 is rotated by a motor 2, a light beam emitted from a light source (not shown), e.g., a semiconductor laser, in the optical head 3 is focused by the object lens 4 arranged in the optical head 3 to be irradiated onto the optical disk 1.

The reflection/diffraction light of the light irradiated on the optical disk 1 is detected by a photodetector (not shown) in the optical head 3. As this photodetector, a split photodetector having a plurality of split detection surfaces is generally used. A plurality of detection signals obtained as electrical signals from the photodetector are amplified by the amplifier 5 and input to the operating circuit 6. The operating circuit 6 performs analog operations (addition and subtraction) with respect to the input detection signals to generate a reproducing signal Si corresponding to the information recorded on the optical disk 1, a tracking servo signal St, and a focus servo signal Sf. The tracking servo signal St and the focus servo signal Sf are supplied as control signals to an actuator (not shown) for driving the object lens 4 in the radial direction (track width direction) of the optical disk 1 and the optical axis direction.

The reproducing signal Si output from the operating circuit 6 is input to the filter 7 (e.g., a transversal filter or analog filter). The filter 7, whose arrangement will be described in detail later, performs equalization and the like to compensate for intersymbol interference of the reproducing signal Si. An output signal So from the filter 7 is input to the PLL 8 and the data identification circuit 9. The PLL 8 extracts a channel clock component as a fundamental clock from the output signal So. The fundamental clock is used to record information on the optical disk 1. The PLL 8 then supplies the channel clock component to the data identification circuit 9.

The data identification circuit 9 determines "0" and "1" of the output signal So from the filter 7 on the basis of the channel clock to perform data identification of the modulation signal of the information recorded on the optical disk 1. More specifically, the data identification circuit 9 performs data identification by comparing the output signal. So from the filter 7 with an appropriate threshold (Th) within a predetermined time width (to be referred to as a window width hereinafter) starting from the leading or trailing edge of the channel clock. An output signal from the data identification circuit 9 is input to the data decoder 10. The modulation code is then decoded by the data decoder 10. As a result, the information recorded as the modulation signal on the optical disk 1 is reproduced.

The basic arrangement of the above signal processing system is known. The present invention is characterized by the arrangement of the filter 7, in particular, of the above arrangement. The filter 7 will be described below. In the following description, a "filter" means a transversal filter.

Figure 2:
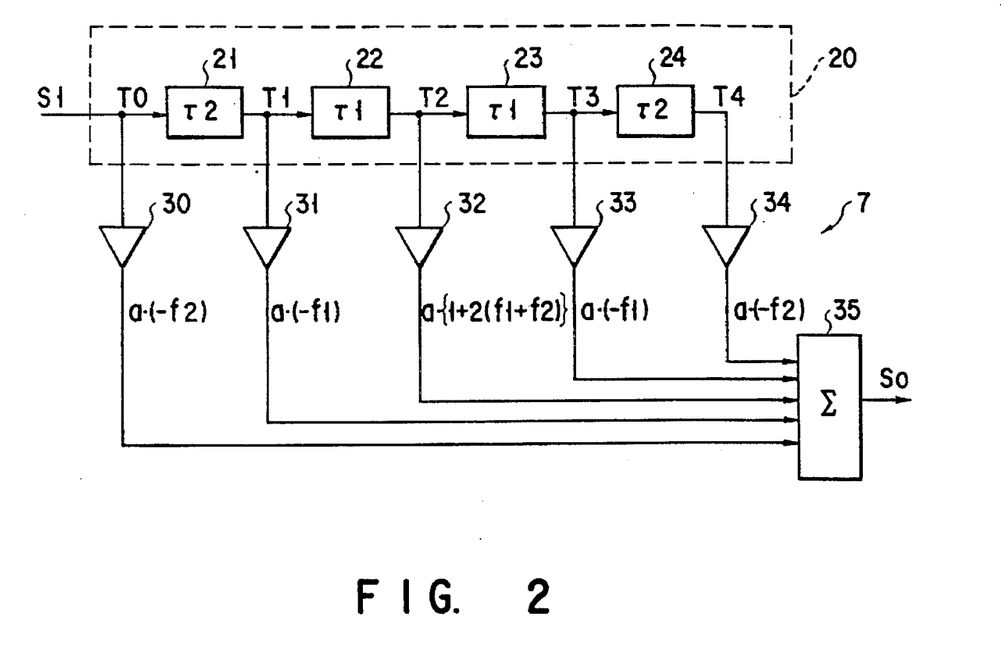
FIG. 2 is a circuit diagram showing the arrangement of a filter in FIG. 1.

FIG. 2 shows the arrangement of the filter 7.

The filter 7 is constituted by a delay circuit 20, multipliers 30 to 34 for weighted addition, and an adder 35. The reproducing signal Si from the operating circuit 6 in FIG. 1 is input to the delay circuit 20. The delay circuit 20 includes a plurality of (four in this case) unit delay elements 21 to 24 connected in series, and a plurality of (five in the first embodiment) taps T0 to T4. If the reproducing signal Si output from the operating circuit 6 is an analog signal, the delay circuit 20 is constituted by an analog signal delay line, e.g., a CCD.

Each of the unit delay elements 21 and 24 has a delay time $\tau 2$. Each of the unit delay elements 22 and 23 has a delay time $\tau 1$. As shown in FIG. 2, since the unit delay elements 21 to 24 are respectively located between the adjacent taps T0 to T4, each delay time, i.e., the delay time between the adjacent taps, is called a "tap period". Note that the tap period is usually set to satisfy $\tau 1 = \tau 2 = \tau$.

Output signals from the respective taps T0 to T4 are multiplied by coefficients (tap coefficients) $a \cdot (-f2)$, $a \cdot (-f1)$, $a \cdot \{1+2(f1+f2)\}$, $a \cdot (-f1)$, and $a \cdot (-f2)$ by the multipliers 30 to 34. The respective products are added by the adder 35 to obtain the equalized output signal So. Note that a is a constant other than 0, and may be positive or negative. As the tap coefficient by which the output signal from the central tap T2 (to be referred to as the main tap hereinafter) is to be multiplied, the above coefficient $a \cdot \{1+2(f1+f2)\}$ is selected such that the sum of the tap coefficients by which the output signals from all the taps T0 to T4 becomes a. This is because when an input signal (reproducing signal Si) to the filter 7 is a DC signal, the output signal So also becomes a DC signal to allow the filter 7 to be simply regarded as a DC amplifier having an amplification factor a.

In this case, if a signal passing through the multiplier 32 connected to an output signal from the central tap T2 (main tap) of the delay circuit 20 is regarded as a main component, the filter 7 in FIG. 2 equalizes the reproducing signal Si by adding, as a correction amount to the main component, the products of tap coefficients different from the tap coefficient by which the output signal from the main tap T2 is multiplied with the output signals from the taps T0, T1, T3, and T4, i.e., the signals separated from the output signal from the main tap T2 by $\pm\tau 1$ and $\pm(\tau 1+\tau 2)$.

The reason why output signals from the taps T0, T1, T3, and T4 located before and after the main tap T2 are multiplied by tap coefficients having symmetrical values is that the shape of a mark on the optical disk 1 and the shape of a light beam from the optical head 3 exhibit symmetry in the forward/backward direction (track direction), i.e., the time base direction. If no such symmetry is recognized, good characteristics may be expected when the tap coefficients in the filter 7 are made asymmetrical accordingly.

The filter 7 shown in FIG. 2 has a five-tap arrangement. However, in order to simplify the circuit, the filter 7 may have a three-tap arrangement without the taps T0 and T4, each having a delay time $\pm(\tau 1+\tau 2)$ with respect to an output signal from the main tap T2, or may have a seven-tap arrangement which additionally has two taps, each having a delay time $\pm(\tau 1+\tau 2+\tau 3)$. Alternatively, the filter 7 may have an arrangement constituted by eight or more taps. With an increase in the number of taps, the degree of freedom in design increases to improve the performance. However, the circuit is complicated accordingly. That is, the number of taps of the filter 7 must be determined in consideration of both these factors. As will be described in detail later, the five-tap arrangement is the most effective arrangement in terms of both the performance and the circuit size, considering that the positions of the foot of the main lobe and side lobes of the first degree of a light beam correspond to the use of the five taps. With six or more taps, no significant improvement in performance can be expected.

Although $\tau 1$ and $\tau 2$ need not be equal, if they are equal, the circuit arrangement can be simplified. In addition, when the tap period is to be adjusted to a position corresponding to the foot of the main lobe and side lobes of the first degree, since the ratio of $\tau 1$ to $\tau 2$ is almost 1, sufficient performance can be ensured even if $\tau 1=\tau 2$.

According to the present invention, the tap period $\tau(\tau 1, \tau 2,$ or the like) in the filter 7 and the frequency characteristics of an analog filter used in place of the transversal filter are optimized to effectively reduce the influences of intersymbol interference and crosstalk in the reproducing signal Si, thereby improving the quality of a reproducing signal obtained from the output terminal of the filter 7 or the analog filter and having undergone equalizing, and reducing the error rate. Embodiments of the above apparatus of the present invention will be described in detail below.

(First Embodiment)

In the first embodiment, the optimization of the tap period in a filter 7 will be described.

Figure 3:
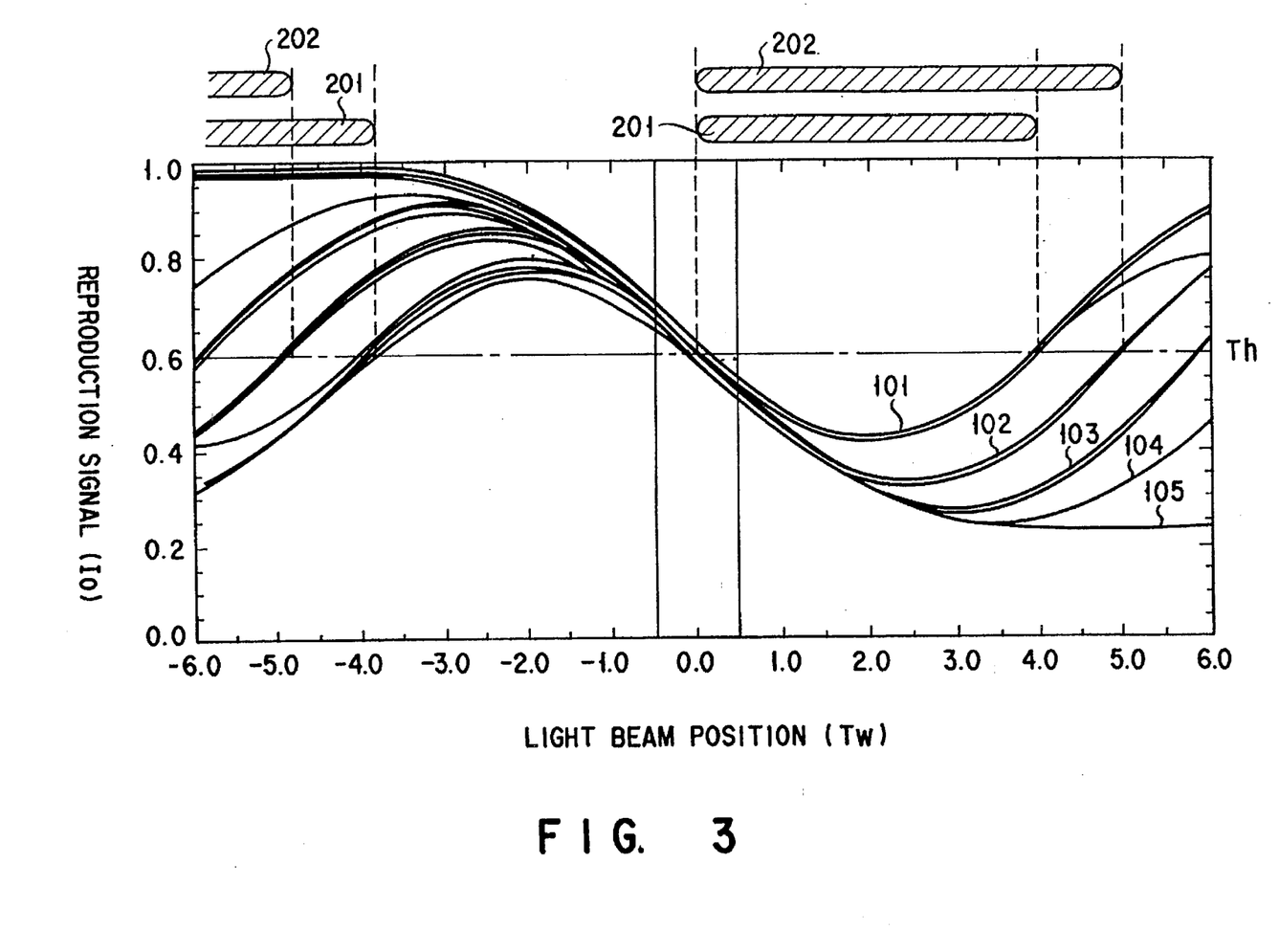
FIG. 3 is a graph showing the waveforms of reproducing signals in the first embodiment.

FIG. 3 is a graph showing the waveforms of reproducing signals in the first embodiment. The abscissa indicates the light beam position on an optical disk 1; and the ordinate, the amplitude of the reproducing signal Si. Reference symbol Th denotes the threshold of the data identification circuit 9 in FIG. 1. FIG. 3 shows the waveforms of reproducing signals corresponding to various pit patterns on the optical disk 1. These waveforms of the reproducing signals are classified into five groups 101 to 105. For example, a pit pattern 201 and a pit pattern 202 correspond to the group 101 and group 102 shown in left down side of FIG. 3, respectively. The amplitude of the reproducing signal Si is small at a position where a pit is present, and large at a position where no pit is present.

In the first embodiment, a reproducing light beam emerging from an optical head 3 has a wavelength ($\lambda$) of 650 nm, and an object lens 4 has a numerical aperture (NA) of 0.6. The optical disk 1 is of a read-only type, on which information is recorded as a pit string whose length and interval are determined according to the mark length recording scheme. The recorded information has been modulated into an RLL code (run length limited code) in which the maximum and minimum values of the pit interval and pit length are specified. In this case, both the pit interval and the pit length are represented by integers 4 to 18, with a channel bit length Tw being considered as a unit. Such an RLL code is expressed as (4, 18)RLLC. In this case, the channel bit length Tw corresponds to the window width used in the data identification circuit 9 in FIG. 1, and is set to be, e.g., 0.12 µm. In this specification, when there is no possibility of misunderstanding, a physical length on the optical disk 1 and a corresponding time are sometimes expressed with the same symbol or unit. In this case, corresponding conversion is performed by using the scanning speed of a light beam (the speed of the optical disk 1 relative to a light beam) as a conversion coefficient.

As shown in FIG. 3, although the edge positions of the pit patterns 201 and 202 are the same, the trailing edges of the corresponding reproducing signals are different from each other. Such a phenomenon occurs owing to the influences of pits before and after the pit patterns 201 and 202 (i.e., intersymbol interference). The intersymbol interference occurs because a light beam focused on the optical disk 1 has a finite diameter and side lobes. That is, the intersymbol interference is caused by signals detected from the optical disk 1 at the positions of the main and side lobes of the intensity distribution of a light beam. This indicates that when the optical disk 1 is to be scanned with a light beam to reproduce information, a signal detected in advance by a time corresponding to the distance from the central position of the intensity distribution of the light beam to the position of the foot of the main lobe or a side lobe or a signal detected with a delay time corresponding to the above distance has a strong correlation with the amount of intersymbol interference.

Figure 4:
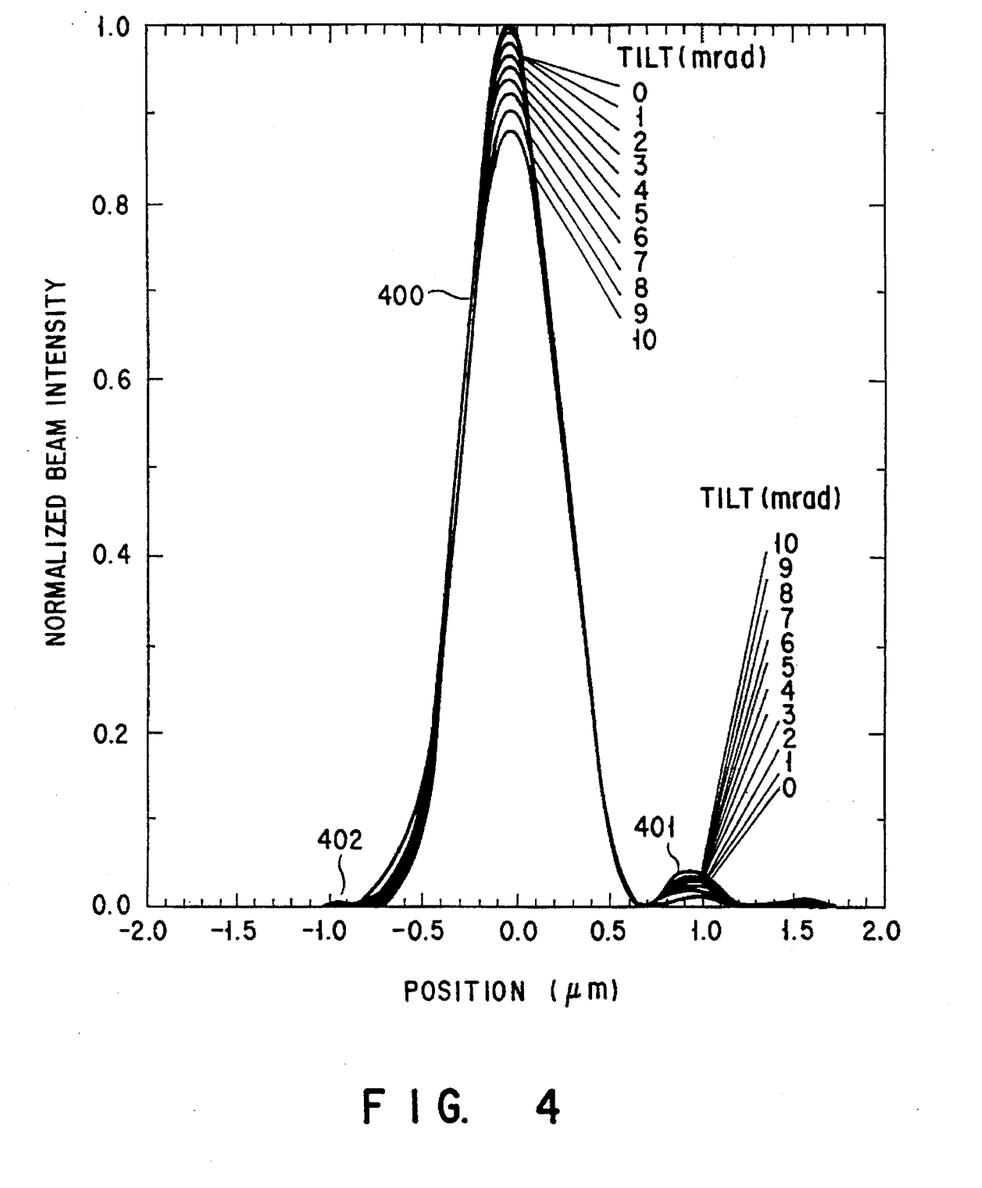
FIG. 4 is a graph showing the intensity distributions of reproducing light beams in the first embodiment.

FIG. 4 is a graph showing the intensity distributions of light beams in the first embodiment. The abscissa indicates the position, and the ordinate, the intensity.

Owing to the influence of the diffraction phenomenon of a light beam on the surface of the optical disk 1, the minimum points of the intensity are present at the positions of the foot of the intensity distribution of the light beam (with reference to the center (beam center) of the intensity distribution), i.e., the two ends of a main lobe 400, and regions 401 and 402 in which the intensity increases again are located ahead of the two edges. These regions 401 and 402 in which the intensity increases are called side lobes of the first degree. There are side lobes of higher degrees, e.g., second and third degrees, ahead of the side lobes 401 and 402 of the first degree. In general, however, the intensities of these side lobes of higher degrees sequentially decrease, and hence can be almost neglected.

FIG. 4 also shows changes in intensity distribution as the optical disk 1 tilts with respect to a light beam. The abscissa indicates the light beam position in the radial direction ("0.0" corresponds to the beam center); and the ordinate, the normalized beam intensity. "Tilt" indicates the tilt angle of the optical disk 1 with respect to the light beam in radians. As shown in FIG. 4, when the optical disk 1 tilts in the radial direction (track width direction) with respect to the light beam, the side lobe 401 on one side increases, but the side lobe 402 on the other side decreases, while the foot of the main lobe 400 tends to broaden.

In the first embodiment, the influences of the foot of the main lobe and the side lobes of the intensity distribution of the light beam are removed by the filter 7 in the following manner.

In the optical information reproducing apparatus shown in FIG. 1, the width of the intensity distribution of the focused light beam and the distance from the beam center to the side lobes 401 and 402 are dependent on the wavelength ($\lambda$) and the numerical aperture (NA) of the object lens 4. In a general optical disk apparatus having performance attained near the diffraction limit, this distance is an amount proportional to ($\lambda$/NA). As is apparent from FIG. 4, the side lobes 401 and 402 are located at distances of about 0.8 to 1.1 µm from the beam center. The middle position between the beam center and the side lobes 401 and 402, i.e., the position separated from the beam center by 0.4 to 0.55 µm, corresponds to the position where the influence of the foot of the main lobe 400 is well reflected.

As is apparent from the above description, when the tap period is set to be $\tau=\tau1=\tau2$ as a parameter value for the filter 7 having the five-arrangement shown in FIG. 2, a distance D=0.4 to 0.55 µm from the beam center to the middle position between the side lobes 401 and 402 should correspond to the time required to scan a light beam. That is, if the scanning speed of a light beam is represented by v, a value D/v=0.4 to 0.55 µm/v obtained by dividing the distance D by the scanning speed v may be set to be the tap period $\tau$.

Assume that the tap period g is selected in the above manner. In this case, when a component based on the center (beam center) of the main lobe 400 appearing in a reproducing signal appears in an output signal from the tap T2, components based on the influences of the side lobes 401 and 402 appear in output signals from the taps T0 and T4. As described above, each of the tap coefficients a·(−f2), a·(−f1), a·(−f1), and a·(−f2) by which output signals from the taps T0, T1, T3, and T4 are multiplied has the opposite polarity to and is smaller in magnitude (absolute value) than the tap coefficient a·{1+2×(f1+f2)}. By selecting appropriate values as a·f1 and a·f2, components based on the influences of the foot of the main lobe 400 and the side lobes 401 and 402 in the reproducing signal Si are reduced or canceled in the output signal So from the filter 7 in the stage in which weighted addition of the output signals from the taps T0 to T4 is performed by the multipliers 30 to 34 and the adder 35.

In a general optical disk apparatus having performance attained near the diffraction limit of a light beam, the above tap period D/v is an amount proportional to $\lambda$/NA. For this reason, in an optical disk apparatus in which the wavelength $\lambda$ of the light beam and the numerical aperture of the object lens are different from those of the above apparatus, a value obtained by normalizing D/v=0.4 to 0.55 µm with $\lambda$/NA, the optimal parameter value, needs to correspond to the above value. That is, since $\lambda$=650 nm and NA=0.6, 0.4 µm×0.6/650 nm=0.37 and 0.55 µm×0.6/650 nm=0.51. The tap coefficient $\tau$, therefore, may be given by $$\tau = (0.37 \text{ to } 0.51) \times \lambda/(v \times NA) \quad (1)$$

In the optical disk 1, the minimum pit length is made to correspond to the effective diameter of a light beam. The effective diameter of the light beam roughly corresponds to the distance D. As described above, D=(0.37 to 0.51)×$\lambda$/NA. Therefore, letting Lmin be the minimum bit length, equation (1) can also be expressed as $$\tau = Lmin/v \quad (2)$$

(Second Embodiment)

In the second embodiment, the first practical example of the optimization of the tap coefficients of a filter 7 will be described.

In the second embodiment, information is recorded on an optical disk 1 in the form of a modulation signal with a pit length or interval corresponding to an integer multiple of 0.12 µm. The value 0.12 µm is called a channel clock period, to which the window width Tw of the data identification circuit 9 in FIG. 1 is set to be equal. In the second embodiment, a minimum pit length Lmin on the optical disk 1 is four times the window width Tw, whereas the tap period g in the filter 7 is 0.48 µm.

Figure 5:
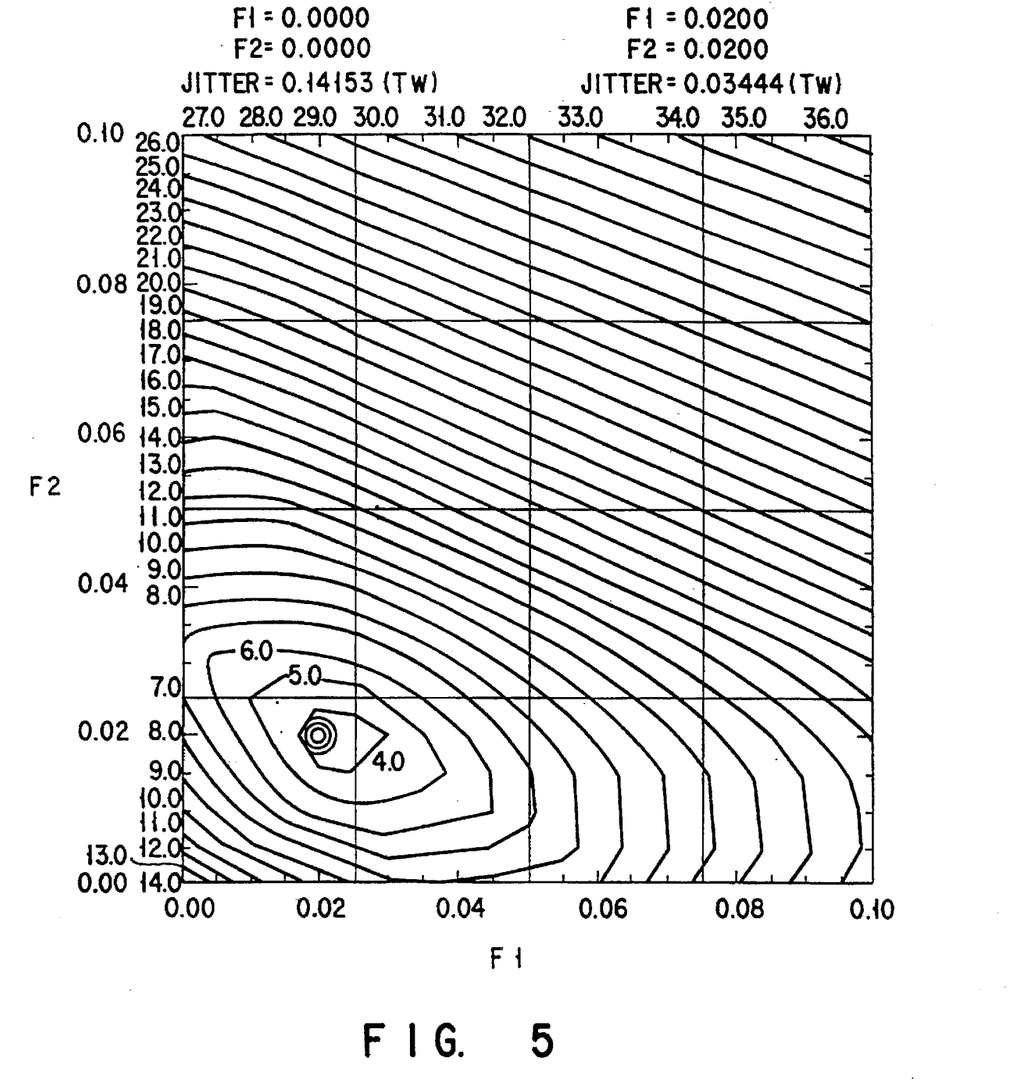
FIG. 5 is a graph showing the tap coefficients of a transversal filter and the jitter characteristics of reproducing signals in the second embodiment.

FIG. 5 is a graph showing the tap coefficients of the filter 7 and the jitter characteristics of a reproducing signal in the second embodiment. "F1" on the abscissa represents a tap coefficient f1; and "F2" on the ordinate, a tap coefficient f2. The values expressed by the contour lines are the ratios, expressed in percentage, between the maximum values of variations in the positions of the leading and trailing edges of a reproducing signal, obtained by calculations with respect to various reproducing signals, and the window width Tw. A value twice each of these ratios corresponds to the window occupation ratio (percentage), and a value obtained by subtracting the window occupation ratio from 100 is a window margin (percentage).

In the filter 7 shown in FIG. 2, by setting as the tap coefficients f1 and f2 the values of F1 and F2 at positions where the variations in the edge positions of the reproducing signal become small, good equalizing characteristics suffering little influence of intersymbol interference can be obtained. More specifically, as is apparent from in FIG. 5, if $$0.01 \leq f1 \leq 0.05$$

$$0.001 \leq f2 \leq 0.04 \quad (3)$$

then good equalizing characteristics exhibiting a window occupation ratio of almost 20% or less, which ratio is required in practice, can be obtained.

In the first and second embodiments, the tap interval g in the filter 7 is set to be an integer multiple of the window width Tw, but the present invention is not limited to this. Since the window width Tw is equivalent to the fundamental clock period in the signal processing system, if the tap period $\tau$ is set to be an integer multiple of the window width Tw, the circuit arrangement of the signal processing system is facilitated.

In the first and second embodiments, an analog signal delay line is used as the delay circuit. If, however, a reproducing signal is converted into a digital signal through an A/D converter, the delay circuit may be constituted by a shift register. In this case, the transfer operation of the shift register may be performed in accordance with a signal reproducing clock synchronized with a channel clock.

In the first and second embodiments, the tap period is made to correspond to the minimum pit length, but the present invention is not limited to this. In this case, if the tap period is set to be equal to the minimum pit length or the minimum pit interval, a correction amount for a pattern suffering large intersymbol interference can be accurately and effectively generated, which is advantageous in terms of system configuration. As is apparent from FIG. 3, the above description can be understood from the fact that the position of the trailing edge of a reproducing signal waveform varies forward and backward depending on the length of a preceding pit and the distance to a succeeding pit. That is, a position strongly reflecting the length of a preceding pit or the distance to a succeeding pit is near a position at the distance corresponding to the minimum pit length or the minimum pit interval.

(Third Embodiment)

In the third embodiment, the second practical example of the optimization of the tap coefficients of a filter 7 will be described.

The specifications of the optical system of an optical head 3 in the third embodiment are basically the same as those in the first and second embodiments except that the track density is set to be higher by setting a track pitch of 0.72 μm to increase the recording density. When the track pitch is set to be a value as small as about 0.9 times or less λ/NA, crosstalk as leakage of signals from adjacent tracks increases. In particular, if the influences of side lobes increase because an optical disk 1 tilts with respect to a light beam, the influences on the crosstalk become conspicuous.

Figure 6:
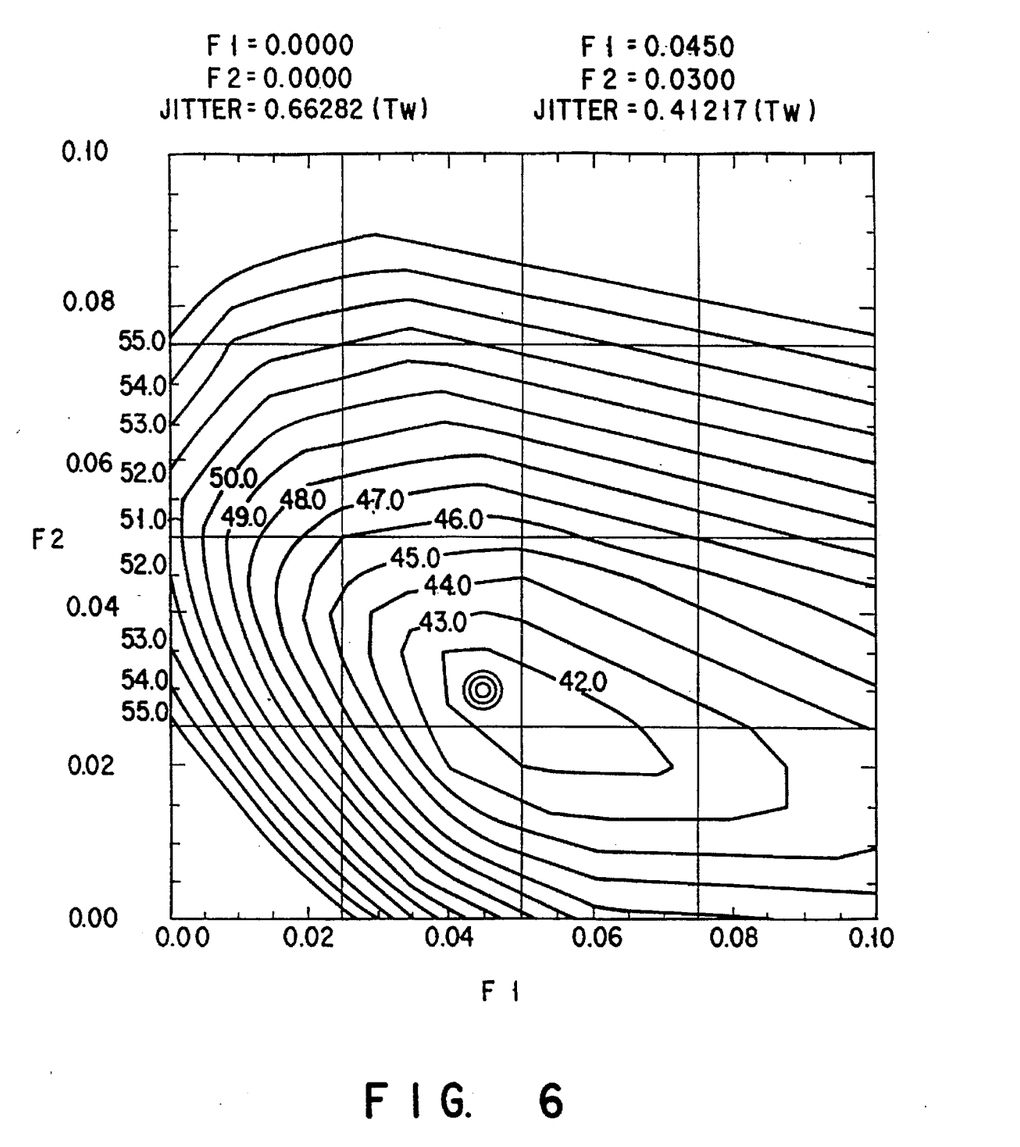
FIG. 6 is a graph showing the tap coefficients of a transversal filter and the jitter characteristics of reproducing signals in the third embodiment.

FIG. 6 is a graph showing the tap coefficients of the filter 7 and the jitter characteristics of a reproducing signal in the third embodiment. In FIG. 6, the above data are plotted in almost the same manner as in FIG. 5. In the third embodiment, since a disk tilt of 10 mrad (i.e., the tilt of the optical disk 1 with respect to a light beam) and various pit patterns on adjacent tracks are taken into consideration, the window occupation ratio considerably increases owing to the jitters caused by crosstalk. This tilt, 10 mrad, is the upper limit value generally allowed in the field of optical disks. The tilt includes a tilt caused by the deformation or the like of the optical disk 1 itself and a tilt originating from a mechanical portion such as the spindle of the apparatus body. It suffices to suppress the sum of these tilts to 10 mrad or less.

In the optical disk apparatus in which the track pitch is reduced in this manner, the optimal tap coefficients of the filter 7 are different from those in the third embodiment. That is, as is apparent from FIG. 6, if $$0.03 \leq f1 + (f2 \times 2) \leq 0.08$$

$$0 \leq (f1 \times 2) - f2 \leq 0.2 \quad (4)$$

then characteristics maintaining a window occupation ratio of about 90% or less, which is required in practice, can be obtained.

The optimal characteristics can be obtained especially in the following range:

$$0.03 \leq f1 \leq 0.07$$

$$0.015 \leq f2 \leq 0.04 \quad (5)$$

In this range, the window occupation ratio can be suppressed to about eighty-odd percent.

(Fourth Embodiment)

In the fourth embodiment, the third practical example of the optimization of the tap coefficients of a filter 7 will be described.

The specifications of the optical system of an optical disk 1 and an optical head 3 in the fourth embodiment are almost the same as those in the third embodiment except that the window width is set to be 0.144 μm, which is smaller than that in the third embodiment about 20%. However, almost the same recording density as that in the third embodiment is realized by using a code system in which the minimum pit length is as small as three times the window width. For this reason, the minimum pit length is smaller than that in the third embodiment.

Figure 7:
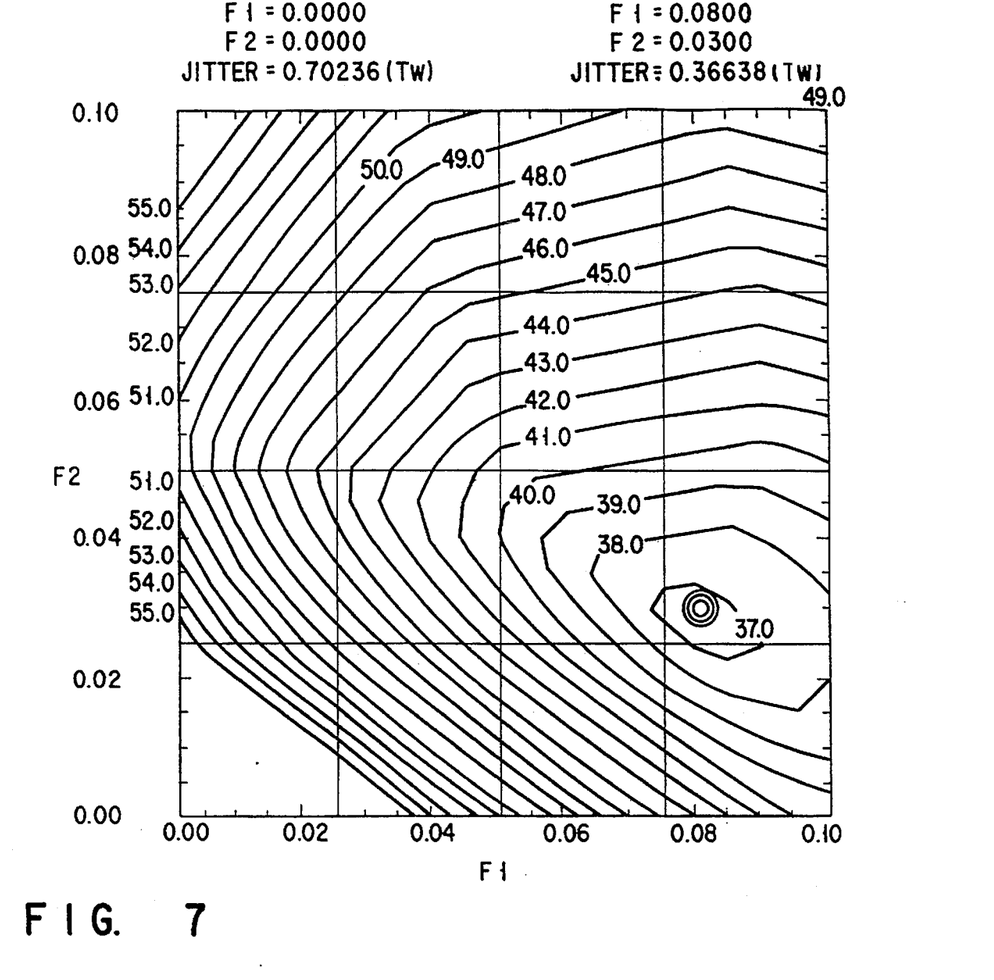
FIG. 7 is a graph showing the tap coefficients of a transversal filter and the jitter characteristics of reproducing signals in the fourth embodiment.

FIG. 7 is a graph showing the tap coefficients of the filter 7 and the jitter characteristics of a reproducing signal in the fourth embodiment. The tap period is set to be 3×Tw in correspondence with the minimum pit length. In the fourth embodiment, as in FIG. 6, a disk tilt of 10 mrad and various pit patterns on adjacent tracks are taken into consideration. In comparison with the graph shown in FIG. 6, in the fourth embodiment, since the minimum pit length and the minimum pit interval are reduced, the intersymbol interference increases. In addition, since the reproducing signal amplitude also decreases, the variations (jitters) in the edge positions of a reproducing signal waveform due to crosstalk slightly increase. However, since the increase in the variations in the edge positions of the reproducing signal waveform is smaller than the increase in window width, the window occupation ratio decreases, but the window margin increases.

As described above, in the optical disk apparatus in which the track pitch is decreased, since crosstalk is the main cause of variations in the edge positions of a reproducing signal waveform, the use of a code having a large window width may be effective in suppressing such variations. In an RLL code, a minimum successive count d of 0s and a maximum successive count k are important factors. In the third embodiment, the RLL code corresponds to d=3, but in the fourth embodiment, the RLL code corresponds to d=2. Although the window with in an RLL code corresponding to d=1 further increases, since the minimum pit length further decreases, the requirement for the resolution of the optical system becomes stricter. As is apparent from FIG. 7, the optimal range is given by:

$$0.04 \leq f1 \leq 0.11$$

$$0.01 \leq f2 \leq 0.06 \quad (6)$$

In this range, the window occupation ratio can be suppressed to about 70 to 80%.

According to the conventional technique, the transversal filter is optimized for a disk tilt of 0. In contrast to this, in the third and fourth embodiments, the equalizing characteristics of the filter 7 are optimized for the tilted state (10 mrad in particular) of the optical disk 1 with respect to a light beam.

(Fifth Embodiment)

The specifications of an optical system and an optical disk 1 in the fifth embodiment are basically the same as those in the first to fourth embodiments except that an analog input type passive or active filter is used in a signal processing circuit in place of the filter 7 shown in FIGS. 1 and 2. These analog filters can be constituted by resistors, capacitors, and inductors or combinations thereof, or transistors, FETs, and operational amplifiers or combinations thereof. With the use of such an analog filter, an inexpensive signal processing circuit can be realized without requiring any expensive delay line. With regard to these analog filters, various circuit schemes are known, and the degree of freedom in design is high. In addition, various design theories have been studied.

The fifth embodiment utilizes the degree of freedom in design of such an analog filter to realize the same function as that of the filter 7 in the first to fourth embodiments.

The operation principle of a general analog filter is different from that of a transversal filter. For this reason, it is difficult to realize exactly the same characteristics as those of the transversal filter. It is, however, possible to realize a sufficiently practical performance by approximating the characteristics of the analog filter to those of the transversal filter. More specifically, such performance can be realized by setting amplification factors corresponding to several characteristic frequencies determined by a modulation code scheme and the resolution of an optical system within a predetermined range.

Letting τ1 and τ2 be the tap periods in the filter 7 shown in FIG. 2, and a·f1 and a·f2 be the tap coefficients, the frequency response function, g(v), of the filter 7 are given by:

$$g(v)=g(0)\times[1+2 \cdot f1\{1-\cos(2\pi v \tau 1)\}$$
$$+2 \cdot f2\{1-\cos(2\pi v(\tau 1+\tau 2))\}] \quad (7)$$

When τ=τ1=τ2, the frequency response function are given by:

$$g(v)=g(0)\times[1+2 \cdot f1\{1-\cos(2\pi v \tau)\}$$
$$+2 \cdot f2\{1-\cos(4\pi v(\tau))\}] \quad (8)$$

That these equations are real functions means that phase leads and lags other than phase lags proportional to frequencies must be sufficiently small. Assume that the window occupation ratio is to be set to b% or less. In this case, phase leads and lags other than phase lags proportional to frequencies must be set within at least ±π×(b/100) rad throughout the signal frequency band.

Since a reproducing signal Si to be input to this filter has a cutoff frequency vmax determined by the resolution of the optical system, it suffices if the characteristics given by the above equations are approximately reproduced within the range of v<vmax. Strictly speaking, it suffices if the characteristics given by the above equations are approximately reproduced within the frequency band of modulation signals to be used. In the case of τ=τ1=τ2, the values of g(v) at typical frequencies are:

$$g(4/(4\tau)) = g(0)$$
$$g(3/(4\tau)) = (1 + 2 \times f1 + 4 \times f2) \times g(0)$$
$$g(2/(4\tau)) = (1 + 4 \times f1) \times g(0)$$
$$g(1/(4\tau)) = (1 + 2 \times f1 + 4 \times f2) \times g(0) \quad (9)$$

When τ is set in correspondence with the minimum pit length, the maximum repetition frequency, v0, of a reproducing signal corresponds to ½τ. In a general optical disk apparatus, a signal exceeding the maximum frequency v0 approaches the performance limit of the optical system, so that the amplitude rapidly decreases. For this reason, no problem is posed. Therefore, these characteristics may be reproduced at λ=½τ and λ=¼τ. That is, when the maximum frequency of a modulation signal is set to v0, then $$g(v0)=(1+4 \times f1) \times g(0)$$
$$g(v0/2)=(1+2 \times f1+4 \times f2) \times g(0) \quad (10)$$

If equations (10) are applied to form an analog filter which approximately realizes relations (3) representing the characteristics of the filter 7 in the second embodiment, then $$g(v0)=(1.14 \text{ to } 1.2) \times g(0)$$
$$g(v0/2)=(1.06 \text{ to } 1.26) \times g(0) \quad (11)$$

If equations (10) are applied to form an analog filter which approximately realizes relations (5) representing the characteristics of the filter 7 in the third embodiment, then $$g(v0)=(1.12 \text{ to } 1.28) \times g(0)$$
$$g(v0/2)=(1.12 \text{ to } 1.30) \times g(0) \quad (12)$$

If equations (10) are applied to form an analog filter which approximately realizes relations (6) representing the characteristics of the filter 7 in the fourth embodiment, then $$g(v0)=(1.16 \text{ to } 1.44) \times g(0)$$
$$g(v0/2)=(1.12 \text{ to } 1.46) \times g(0) \quad (13)$$

Note that (p to q) represents a real number coefficient within the range between p and q.

In brief, all equations (12) and (13) must be included in the ranges defined by:

$$g(v0)=(1.12 \text{ to } 1.44) \times g(0)$$
$$g(v0/2)=(1.12 \text{ to } 1.46) \times g(0) \quad (14)$$

Figure 8:
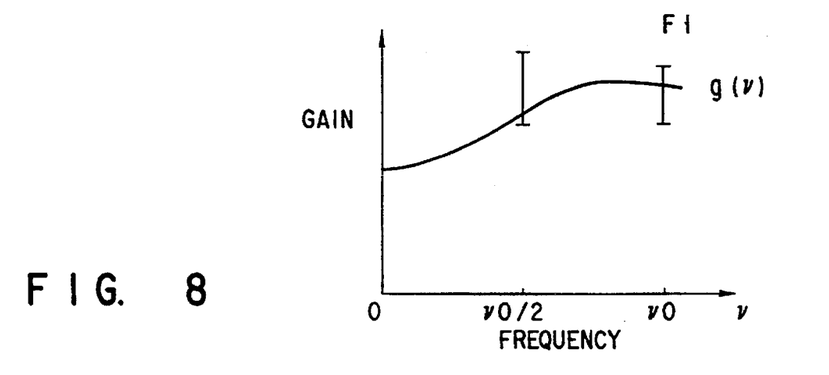
FIG. 8 is a graph showing the filter characteristics of an analog filter in the fifth embodiment.

It is apparent that especially when an RLL code of a system with d=3 or a system with d=2 is employed, characteristics in the above ranges are effective in realizing better characteristics. FIG. 8 shows the filter characteristics in this case. The ordinate indicates the gain; and the abscissa, the frequency. As shown in FIG. 8, by setting the optimal gains with respect to the frequencies v0 and v0/2, almost the same effect as that obtained by the transversal filter in each of the first to fourth embodiments can be obtained.

The present invention is not limited to the embodiments described above, and various modifications of the embodiments can be made. For example, each of the first to fifth embodiments exemplifies an optical disk having a pit string formed therein as a mark string. However, a mark string of another form may be formed, and an optical disk of a type different from the read-only type, e.g., an optical disk of the write-once or rewritable type, may be used. The shape of a recording medium is not specifically limited either. For example, a card-like recording medium may be used. Furthermore, the wavelength of the reproducing light beam and the numerical aperture of the object lens are not limited to those in the embodiments.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical information reproducing apparatus for optically reproducing information from a recording medium on which the information is recorded as a mark string, comprising:

irradiation means for irradiating a light beam onto said recording medium through an object lens; and signal processing means for detecting diffraction light from said recording medium as a reproducing signal, and processing the obtained reproducing signal to reproduce the information recorded on said recording medium, wherein said signal processing means includes a transversal filter, whose characteristics are fixed, having delay means with a plurality of taps for receiving the reproducing signal, and means for performing weighted addition of output signals from the respective taps of said delay means with predetermined tap coefficients to form an output signal containing the reproduced information from said recording medium, said transversal filter having a delay time τ between the respective adjacent taps, the delay time τ set to one of $$\tau = (0.37 \text{ to } 0.51) \times \lambda / (\nu \times NA)$$

and $$\tau = Lmin/v$$

where $\lambda$ is a wavelength of the light beam, NA is a numerical aperture of said object lens, Lmin is a minimum mark length of the mark string, and v is a speed of the recording medium relative to the light beam.

2. An apparatus according to claim 1, wherein said transversal filter has at least first to fifth taps, and when tap coefficients by which output signals from the first to fifth taps are multiplied are respectively represented by $a \cdot (-f2)$, $a \cdot (-f1)$, $a \cdot \{1+2(f1+f2)\}$, $a \cdot (-f1)$, and $a \cdot (-f2)$ (a is a constant other than 0), coefficients f1 and f2 are given by $$0.01 \leq f1 \leq 0.05$$

$$0.01 \leq f2 \leq 0.04.$$

3. An apparatus according to claim 1, wherein said transversal filter has at least first to fifth taps, and when tap coefficients by which output signals from the first to fifth taps are multiplied are respectively represented by $a \cdot (-f2)$, $a \cdot (-f1)$, $a \cdot \{1+2(f1+f2)\}$, $a \cdot (-f1)$, and $a \cdot (-f2)$ (a is a constant other than 0), coefficients f1 and f2 are given by $$0.03 \leq f1 \leq 0.07$$

$$0.015 \leq f2 \leq 0.04.$$

4. An apparatus according to claim 1, wherein said transversal filter has at least first to fifth taps, and when tap coefficients by which output signals from the first to fifth taps are multiplied are respectively represented by $a \cdot (-f2)$, $a \cdot (-f1)$, $a \cdot \{1+2(f1+f2)\}$, $a \cdot (-f1)$, and $a \cdot (-f2)$ (a is a constant other than 0), coefficients f1 and f2 are given by $$0.04 \leq f1 \leq 0.11$$

$$0.01 \leq f2 \leq 0.06.$$

5. An optical information reproducing apparatus for optically reproducing information from a recording medium on which the information is recorded as a mark string, comprising:

irradiation means for irradiating a light beam onto said recording medium through an object lens; and signal processing means for detecting diffraction light from said recording medium as a reproducing signal, and processing the obtained reproducing signal to reproduce the information recorded on said recording medium, wherein said signal processing means includes a filter, whose characteristics are fixed for producing an output signal containing information recorded on said recording medium, having frequency response function given by $$g(v0/2) = (1.12 \text{ to } 1.30) \times g(0)$$

where $g(v)$ is an amplification factor for a signal component having a frequency $v$ of the reproducing signal, and $v0$ is a maximum frequency of the modulation signal.

6. An optical information reproducing apparatus for optically reproducing information from a recording medium on which the information is recorded as a mark string, comprising:

irradiation means for irradiating a light beam onto said recording medium through an object lens; and signal processing means for detecting diffraction light form said recording medium as a reproducing signal, and processing the obtained reproducing signal to reproduce the information recorded on said recording medium, wherein said signal processing means includes a filter, whose characteristics are fixed for producing an output signal containing information recorded on said recording medium, having frequency response function given by $$g(v0/2) = (1.12 \text{ to } 1.46) \times g(0)$$

where $g(v)$ is an amplification factor for a signal component having a frequency $v$ of the reproducing signal, and $v0$ is a maximum frequency of the modulation signal.

7. An optical information reproducing apparatus according to claim 5, wherein said filter has a frequency response function given by $g(v0) = (1.12 \text{ to } 1.28) \times g(0)$.

8. An optical information reproducing apparatus according to claim 6, wherein said filter has a frequency response function given by $g(v0) = (1.16 \text{ to } 1.44) \times g(0)$.

9. An optical information reproducing apparatus according to claim 6, wherein said filter has a frequency response function given by $g(v0) = (1.12 \text{ to } 1.44) \times g(0)$.

* * * * *